United States Patent
Brunn et al.

(10) Patent No.: US 11,057,230 B2
(45) Date of Patent: *Jul. 6, 2021

(54) EXPECTED GROUP CHAT SEGMENT DURATION

(71) Applicant: INTERNATIONAL BUSINESS MACHINES CORPORATION, Armonk, NY (US)

(72) Inventors: Jonathan F. Brunn, Logan, UT (US); Rachael M. H. Dickens, Raleigh, NC (US); Jonathan Dunne, Dungarvan (IE); Ethan A. Geyer, Mebane, NC (US); Liam S. Harpur, Skerries (IE); Bo Jiang, Beijing (CN); Andrew Penrose, Castlenock (IE); Naama Tepper, Koranit (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/684,949

(22) Filed: Nov. 15, 2019

(65) Prior Publication Data
US 2020/0084055 A1 Mar. 12, 2020

Related U.S. Application Data

(63) Continuation of application No. 15/720,265, filed on Sep. 29, 2017, now Pat. No. 10,541,822.

(51) Int. Cl.
*H04L 12/18* (2006.01)
*G06Q 10/04* (2012.01)
(Continued)

(52) U.S. Cl.
CPC .......... *H04L 12/1813* (2013.01); *G06F 17/18* (2013.01); *G06Q 10/04* (2013.01);
(Continued)

(58) Field of Classification Search
CPC ... H04L 12/1831; H04L 51/04; H04L 51/046; H04L 65/403
See application file for complete search history.

(56) References Cited

U.S. PATENT DOCUMENTS

| | | | |
|---|---|---|---|
| 6,606,644 B1 * | 8/2003 | Ford | H04L 12/1831 709/203 |
| 8,214,748 B2 * | 7/2012 | Srikanth | G06Q 10/109 715/751 |

(Continued)

FOREIGN PATENT DOCUMENTS

WO  2015061373 A1  4/2015

OTHER PUBLICATIONS

IBM: List of IBM Patents or Patent Applications Treated as Related (Appendix P), Mar. 11, 2020, pp. 1-2.
(Continued)

*Primary Examiner* — Jeong S Park
(74) *Attorney, Agent, or Firm* — Michael O'Keefe

(57) ABSTRACT

A method, computer system, and computer program product for calculating a group chat segment duration is provided. The embodiment may include capturing a plurality of group chat messages from a chat message repository. The embodiment may also include determining a probability distribution based on analyzing the captured group chat messages over a time vector. The embodiment may further include calculating a time parameter based on the determined probability distribution. The embodiment may also include calculating a content parameter based on one or more relevant chat topics. The embodiment may further include calculating an attendee parameter based on a plurality of attendees and one or more attendee associations. The embodiment may also include determining a chat duration prediction based on the
(Continued)

calculated time parameter, the calculated content parameter, and the calculated attendee parameter.

20 Claims, 13 Drawing Sheets

(51) Int. Cl.
  *H04L 12/58*   (2006.01)
  *G06F 17/18*   (2006.01)
  *G06F 3/048*   (2013.01)
  *H04L 29/06*   (2006.01)
  *G06F 40/30*   (2020.01)

(52) U.S. Cl.
  CPC .......... *H04L 12/1822* (2013.01); *H04L 51/04* (2013.01); *H04L 51/046* (2013.01); *G06F 3/048* (2013.01); *G06F 40/30* (2020.01); *H04L 65/403* (2013.01)

(56) References Cited

U.S. PATENT DOCUMENTS

| | | | |
|---|---|---|---|
| 8,782,145 | B2 | 7/2014 | Cherukuri |
| 9,076,129 | B2 | 7/2015 | Grewal |
| 9,299,348 | B2 | 3/2016 | Gabara |
| 10,541,822 | B2* | 1/2020 | Brunn ................... G06Q 10/04 |
| 2010/0211425 | A1* | 8/2010 | Govindarajan ............................. G06Q 10/063116 705/7.16 |
| 2011/0072362 | A1* | 3/2011 | Denner ................ G06Q 10/109 715/751 |
| 2013/0178959 | A1* | 7/2013 | Hirsch .................... G06F 19/00 700/91 |
| 2014/0316765 | A1* | 10/2014 | Fitterer ................. G06F 40/289 704/9 |
| 2015/0112796 | A1 | 4/2015 | Greenzeiger |
| 2016/0134568 | A1 | 5/2016 | Woo |
| 2016/0261655 | A1* | 9/2016 | Aggarwal ............... H04L 12/18 |
| 2017/0034226 | A1* | 2/2017 | Bostick ................... G06F 40/30 |
| 2018/0046957 | A1* | 2/2018 | Yaari ................. G06Q 10/1095 |
| 2019/0103982 | A1 | 4/2019 | Brunn |

OTHER PUBLICATIONS

Elsner, et al., "Disentangling Chat", © 2010 Association for Computational Linguistics, vol. 36, No. 3, pp. 1-22, accepted for publication: Mar. 3, 2010.

IBM, "IBM Watson—Alchemy API", https://www.ibm.com/watson/alchemy-api.html, p. 1, printed May 1, 2017.

Mell et al., "The NIST Definition of Cloud Computing," U.S. Department of Commerce, National Institute of Standards and Technology, Sep. 2011, p. 1-7, Special Publication 800-145.

Wikipedia, "Latent Dirichlet allocation", https://en.wikipedia.org/wiki/Latent_Dirichlet_allocation, pp. 1-7, printed on May 1, 2017.

Wikipedia, "Phase-type distribution", https://en.wikipedia.org/wiki/Phase-type_distribution, pp. 1-7, printed May 1, 2017.

* cited by examiner

EXPECTED GROUP CHAT SEGMENT DURATION

BACKGROUND

The present invention relates, generally, to the field of computing, and more particularly to chat summarization.

Summarization may relate to the process of generating a shortened document of a corpora. In the field of computing and computer analytics, summarization may be performed using natural language processing software capable of determining one or more major points of the document to be summarized and placing those identified points into a logical sequence. Furthermore, computer summarization of data may be capable of understanding user preconfigured variables when creating a summary, such as summary length, writing style, and syntax.

SUMMARY

According to one embodiment, a method, computer system, and computer program product for calculating a group chat segment duration is provided. The embodiment may include capturing a plurality of group chat messages from a chat message repository. The embodiment may also include determining a probability distribution based on analyzing the captured group chat messages over a time vector. The embodiment may further include calculating a time parameter based on the determined probability distribution. The embodiment may also include calculating a content parameter based on one or more relevant chat topics. The embodiment may further include calculating an attendee parameter based on a plurality of attendees and one or more attendee associations. The embodiment may also include determining a chat duration prediction based on the calculated time parameter, the calculated content parameter, and the calculated attendee parameter.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
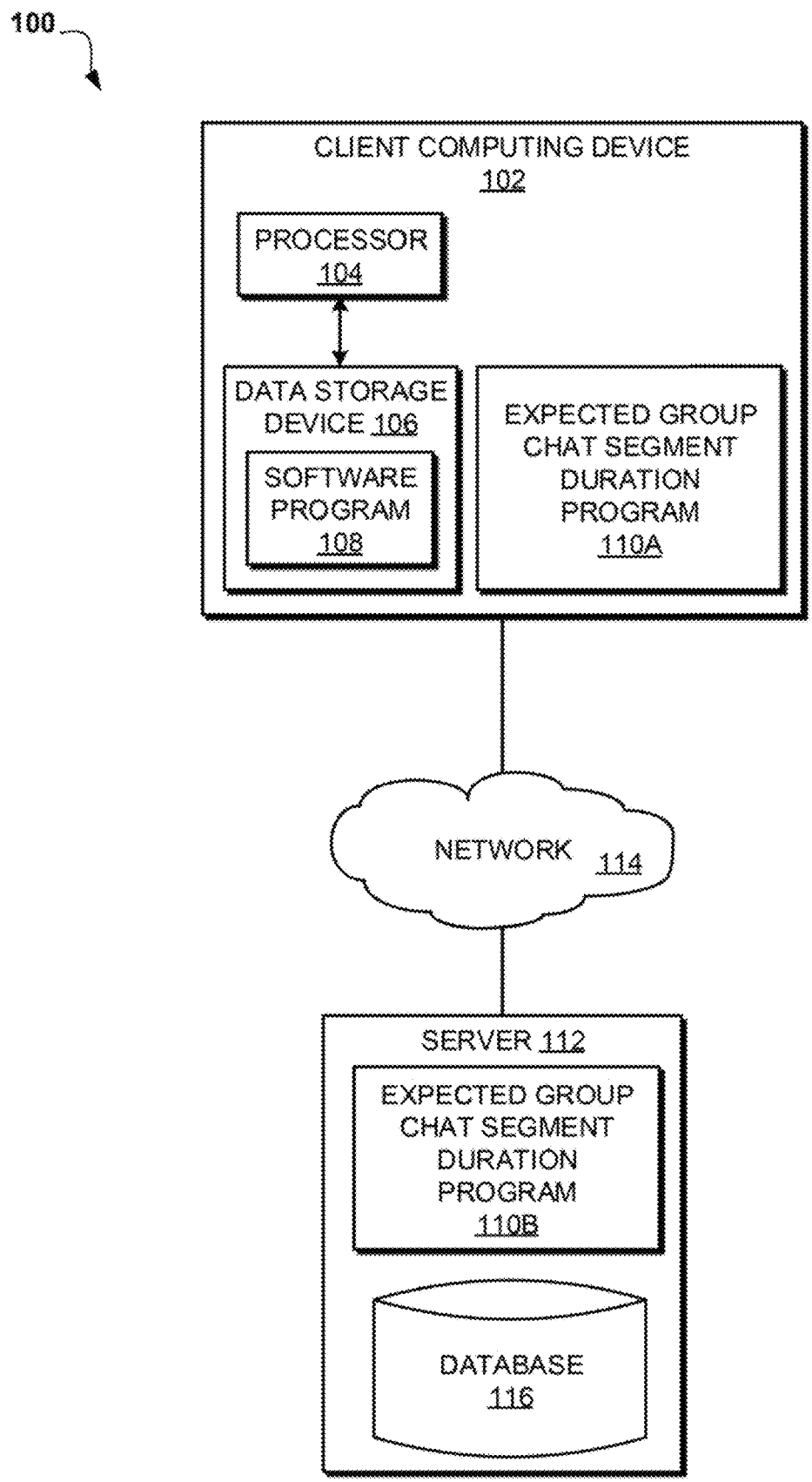
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to chat summarization. The following described exemplary embodiments provide a system, method, and program product to, among other things, predict chat segment duration. Therefore, the present embodiment has the capacity to improve the technical field of chat summarization by analyzing a group chat as segments (e.g., time, topic, and attendee information) rather than as a single monolithic conversation to produce an estimation with a more precise modelling distribution. Additionally, the present embodiment may result in high precision, accurate models in the realm of real-time chat aggregation.

As previously described, summarization may relate to the process of generating a shortened document of a corpora. In the field of computing and computer analytics, summarization may be performed using natural language processing software capable of determining one or more major points of the document to be summarized and placing those identified points into a logical sequence. Furthermore, computer summarization of data may be capable of understanding user preconfigured variables when creating a summary, such as length, writing style, and syntax.

A segment of chat summarization relates to the estimation of chat duration. For example, given a specific topic, calculating the amount of time the topic may be discussed given the individuals participating in the chat conversation. Since persistent chat rooms are becoming a more popular medium to communicate in real time, a chat can persist even when a specific user within a group is not actively participating, such as when a user is offline. Therefore, when a user previously away from the persistent chat returns, the user may be overwhelmed with the amount of interactions exchanged in the user's absence. Chat summarization and estimation techniques may be helpful tools to allow a user to effectively and efficiently review the persistent chat messages in which the user may not have taken part. To easily allow a user to quickly view and understand the conversation that occurred, a highlighted summary of content may be created via text tagging items of user interest. Unfortunately, some summarization methods treat the text as a single monolithic conversation thereby making time estimation difficult. As such, it may be advantageous to, among other things, leverage segmented chat room data to determine an expected time of a chat segment conversation.

According to one embodiment, chat data may be analyzed on the vectors of duration, topic content, and attendee information. The analyzed chat data may then be used to model a probability distribution for the time vector. An additional shape parameter may be derived based on analysis of both the topic and attendee data. Furthermore, a combined model (i.e., a model of models) may then be utilized to infer expected group chat time duration that is presented to the user.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to analyze segmented chat room data to calculate an estimated chat duration of a group chat segment.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and an expected group chat segment duration program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 11, the client computing device 102 may include internal components 1102a and external components 1104a, respectively.

The server computer 112 may be a laptop computer, netbook computer, personal computer (PC), a desktop computer, or any programmable electronic device or any network of programmable electronic devices capable of hosting and running an expected group chat segment duration program 110B and a database 116 and communicating with the client computing device 102 via the communication network 114, in accordance with embodiments of the invention. As will be discussed with reference to FIG. 11, the server computer 112 may include internal components 1102b and external components 1104b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the expected group chat segment duration program 110A, 110B may be a program capable of capturing group chat messages from a repository, such as database 116. The expected group chat segment duration program 110A, 110B may analyze the chat data of the captured messages using various vectors, such as duration, topic content, and attendee information, to model a probability distribution for the time vector and derive a shape parameter based on the topic content and attendee information. The expected group chat segment duration program 110A, 110B may then infer an expected group chat time duration from the combined models. The expected group chat segment duration method is explained in further detail below with respect to FIG. 2.

Figure 2:
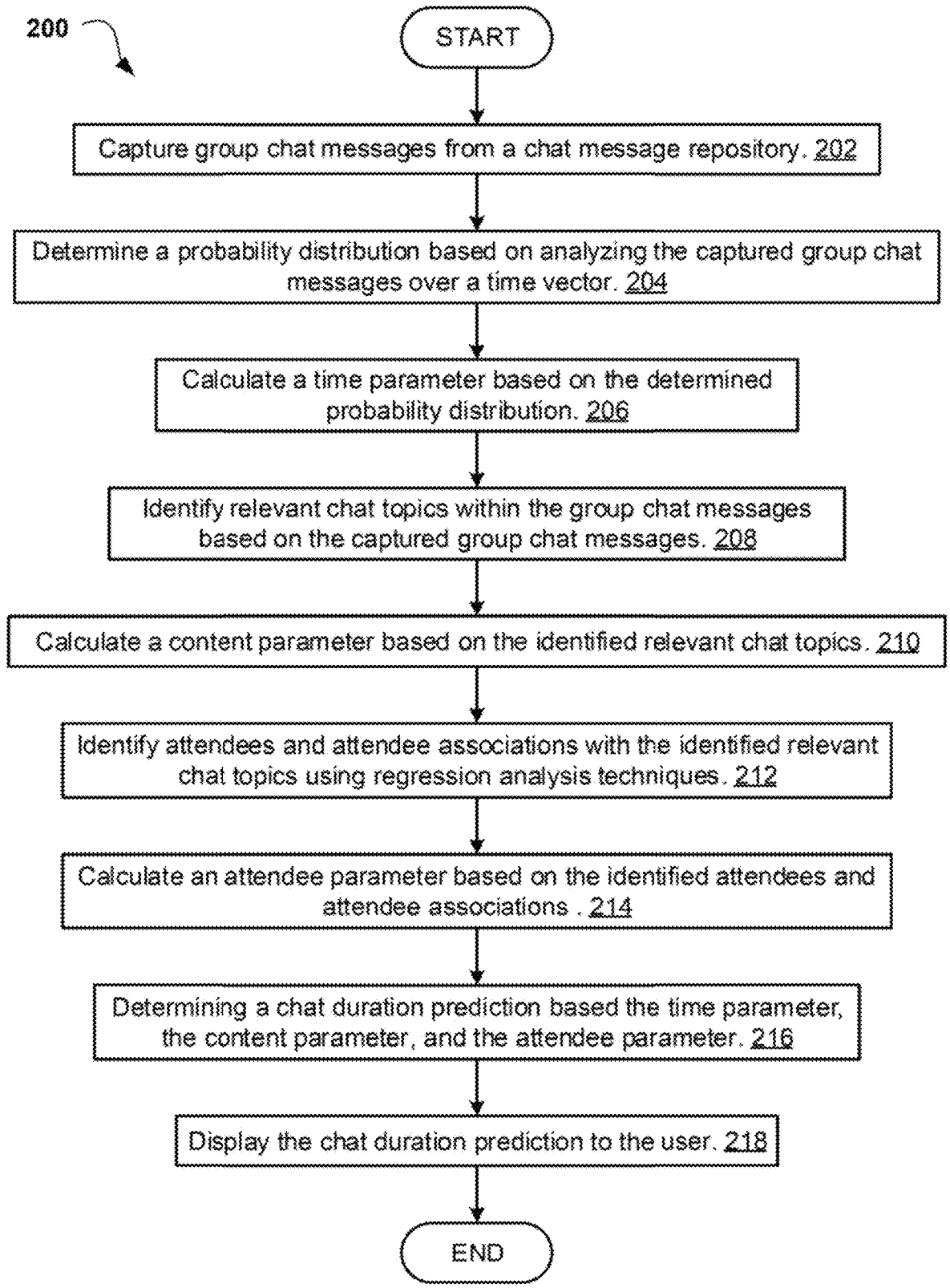
FIG. 2 is an operational flowchart illustrating a chat segment duration process according to at least one embodiment.

FIG. 2 is an operational flowchart illustrating a chat segment duration process 200 according to at least one embodiment. At 202, the expected group chat segment duration program 110A, 110B captures group chat messages from a chat message repository. As messages are received in a group chat session, such as a persistent chat session or a group instant messaging session, the conversation of messages may be stored in a repository, such as database 116. For example, all messages submitted to a persistent chat session may be stored within a chat message repository in order for the complete conversation to be accessed or retrieved by users. In order to provide an analysis of the stored group chat messages, the expected group chat segment duration program 110A, 110B may mine the messages from a chat message repository.

Then, at 204, the expected group chat segment duration program 110A, 110B determines a probability distribution based on analyzing the captured group chat messages over a time vector. The captured group chat messages may be analyzed over a time vector to determine the most likely probability distribution. Additionally, the inter-arrival and service time of each chat message may be analyzed to compute a distribution type based on a goodness of fit (GoF). However, analysis based on a time vector alone may not be sufficient to ensure a GoF as confirmed by the Anderson-Darling GoF test statistic and p-value. The Anderson-Darling GoF test may display data as follows:

data: chat.cluster.9.log and plogis
AD=3.285, p-value=0.01971
Conclusion: Reject hypothesis that data comes from a logistic distribution.

The expected group chat segment duration program 110A, 110B may generate one or more histograms plotted over a time vector when determining the probability distribution. The generated histograms are explained in more detail in FIG. 3.

Next, at 206, the expected group chat segment duration program 110A, 110B calculates a time parameter based on the determined probability distribution. The determined probability distribution may be utilized to derive a shape parameter. Once the probability distribution over a time vector is determined, the expected group chat segment duration program 110A, 110B may use the time vector distribution to determine a time parameter and store the time parameter in a repository, such as database 116.

Then, at 208, the expected group chat segment duration program 110A, 110B identifies relevant chat topics within the group chat messages based on the captured group chat messages. The expected group chat segment duration program 110A, 110B may analyze the text of the captured group chat messages as a whole and line by line to determine or model relevant chat topics within the entire conversation. For example, the expected group chat segment duration program 110A, 110B may analyze the captured group chat messages to determine the chat attendees discussed three different topics and identify each discussed topic. The expected group chat segment duration program 110A, 110B may leverage known textual analysis methods, such as linear discriminant analysis (LDA) and AlchemyAPI® (AlchemyAPI and all AlchemyAPI-based trademarks and logos are trademarks or registered trademarks of International Business Machines Corporation and/or its affiliates), to identify the relevant chat topics within the captured group chat messages.

Next, at 210, the expected group chat segment duration program 110A, 110B calculates a content parameter based on the identified relevant chat topics. The expected group chat segment duration program 110A, 110B may utilize the identified relevant chat topics to derive a second shape parameter. Similar to step 206, once the expected group chat segment duration program 110A, 110B identifies the relevant topics from the captured group chat messages, the expected group chat segment duration program 110A, 110B may calculate a content parameter using the identified chat topics and store the identified content parameter in a repository, such as database 116.

Then, at 212, the expected group chat segment duration program 110A, 110B identifies attendees and attendee associations with the identified relevant chat topics using regression analysis techniques. For each identified relevant chat topic, the expected group chat segment duration program 110A, 110B may determine each attendee that participated in the conversation associated with the chat topic. The expected group chat segment duration program 110A, 110B may leverage known regression analysis techniques to determine whether topic content and attendees are a factor in the group chat duration. Regression analysis may be performed using a table, such as Table 1 below, or from the most parsimonious model using a regression analysis method, such as stepwise regression or least absolute shrinkage and selection operation (LASSO) regression.

TABLE 1

| Total Lines | Total Users | Total Words | Chat Duration | Sentiment Score | Sentiment Type | Emotion (Anger) Relevance |
|---|---|---|---|---|---|---|
| 4 | 3 | 16 | 45.952 | 0.781 | Positive | 0.092 |
| 11 | 4 | 66 | 746.122 | 0.526 | Positive | 0.547 |
| 15 | 2 | 31 | 546.534 | 0.225 | Negative | 0.277 |
| 3 | 1 | 23 | 22.128 | N/A | Neutral | 0.184 |

| Emotion (Disgust) Relevance | Emotion (Fear) Relevance | Emotion (Joy) Relevance | Emotion (Sadness) Relevance | Concepts Text | Concepts Relevance | Keywords Text1 |
|---|---|---|---|---|---|---|
| 0.019 | 0.158 | 0.748 | 0.047 | Colorfulness | 0.915 | Different color |
| 0.120 | 0.225 | 0.049 | 0.158 | Disability | 0.911 | Load balancer work around |
| 0.142 | 0.377 | 0.139 | 0.120 | Usage Share of web browsers | 0.972 | Chrome browser |
| 0.243 | 0.127 | 0.272 | 0.261 | N/A | 0 | Timestamps |

| Keywords Relevance1 | Keywords Text2 | Keywords Relevance2 | Keywords Text3 | Keywords Relevance3 | Keywords Text4 | Keywords Relevance4 |
|---|---|---|---|---|---|---|
| 0.926 | Hello | 0.767 | font | 0.643 | Chrome | 0.619 |
| 0.957 | Workaround | 0.880 | iOS client | 0.746 | Steve on iOS | 0.729 |
| 0.901 | Test | 0.734 | Test send conversation | 0.665 | iOS | 0.593 |
| 0.936 | Team list | 0.816 | | 0.684 | #N/A | #N/A |

| Keywords Text5 | Keywords Relevance5 | Entities Type1 | Entities Relevance1 | Entities Type2 | Entities Relevance2 | Entities Type3 |
|---|---|---|---|---|---|---|
| #N/A | #N/A | TwitterHandle | 0.01 | #N/A | #N/A | #N/A |
| iOS Thanks | 0.720 | Technology | 0.909 | Person | 0.513 | Technology |
| Firefox | 0.544 | Technology | 0.33 | #N/A | #N/A | #N/A |
| #N/A | #N/A | Company | 0.33 | #N/A | #N/A | #N/A |

| Entities Relevance3 | Topic 1 Log Likelihood |
|---|---|
| #N/A | 0.568 |
| 0.447 | 0.234 |
| #N/A | 0.908 |
| #N/A | 0.7677 |

Next, at 214, the expected group chat segment duration program 110A, 110B calculates an attendee parameter based on the identified attendees and attendee associations. The expected group chat segment duration program 110A, 110B may use the output of the regression analysis to calculate a third shape parameter. Similar to steps 206 and 210, once the expected group chat segment duration program 110A, 110B identifies the attendees and attendee associations with the identified relevant chat topics, the expected group chat segment duration program 110A, 110B may calculate a parameter of attendee distribution using known regression analysis techniques and store the attendee parameter in a repository, such as database 116.

Then, at 216, the expected group chat segment duration program 110A, 110B determines a chat duration prediction based on the time parameter, the content parameter, and the attendee parameter. The expected group chat segment duration program 110A, 110B may use known non-linear regression techniques to derive a formula from the model generated in step 212 using the output from an estimation of parameters to determine the relationship between chat duration, attendees, and the volume of utterances. The formula may be generated as follows in Table 2.

TABLE 2

| Coefficients: | Estimate | Standard Error | T value | Pr (>\|t\|) |
|---|---|---|---|---|
| (Intercept) | 4.99996 | 0.32822 | 15.234 | <2e-16 |
| Total.Lines | 0.09329 | 0.00938 | 9.945 | <2e-16 |
| Total Users | 1.31986 | 0.08952 | 14.743 | <2e-16 |
| Emotion_anger_relevance | 4.91910 | 0.71367 | 6.893 | 8.62e-12 |
| Emotion_joy_relevance | −1.76431 | 0.56517 | −3.122 | 0.00184 |
| Concepts_relevance | 1.43797 | 0.31145 | 4.617 | 4.29e-6 |
| Entities_relevance 1 | 2.06575 | 0.31333 | 6.593 | 6.32e-11 |
| Topic1.LogLikelihood | 0.43797 | 0.00145 | 9.617 | <2e-16 |
| Signif. Codes: | 0 +*, 0.001 +, 0.01 +*, 0.05 +., 0.1 +, 1 | | | |
| Residual standard error: | 4.052 on 1266 degrees of freedom | | | |
| Multiple R-squared: | 0.6082 | | | |
| Adjusted R-squared: | 0.6063 | | | |
| F-statistic: | 327.5 on 6 and 1266 DF | | | |
| p-value: | <2.2e-16 | | | |

In at least one embodiment, the expected group chat segment duration program 110A, 110B may fit the four best fitting parameters in the form of a 4-parameter logistic model as follows:

$$F(x) = d + \frac{a-d}{1+\left(\frac{x}{c}\right)^b}$$

Using the values from Table 2, the parameters from the above regression output may be written as D=4.9996, A=0.09329, C=1.31986, and B=0.43797. Therefore, F(x) may be computed as F(x)=4.9996+(0.09329−4.99996)/(1+ (x/1.31986)^0.43797).

By combining the existing time-based probability distribution with the computed shape parameters (i.e., time parameter, content parameter, and attendee parameter), a more accurate model for predicting the expected time of a group chat distribution may be present. FIGS. 3-8 describe how the generated model may encapsulate the observed data. Each figure displays a multi-phase-type distribution with three rate/shape parameters derived from time, topic, and user analysis that may be used to model existing chats.

With the shape and scale parameters of the multi-phase-type distribution now being known, the mathematical moments of the distribution may be calculated (e.g., mean, variance, median). Calculation of each mathematical moment may be achieved through integral calculus.

Next, at 218, the expected group chat segment duration program 110A, 110B displays the chat duration prediction to the user. Once the mathematical moments are calculated, the chat duration prediction time may be displayed by the expected group chat segment duration program 110A, 110B to the user on a graphical user interface on the client computing device 102. The chat duration prediction time may be displayed in various forms, such as a pop up window or alongside a chat space view in a persistent chat program. For example, if a user is participating in five different group chats, the expected group chat segment duration program 110A, 110B may display the chat duration prediction time for each group chat as an overlay to a group chat tab for each chat session.

Figure 3:
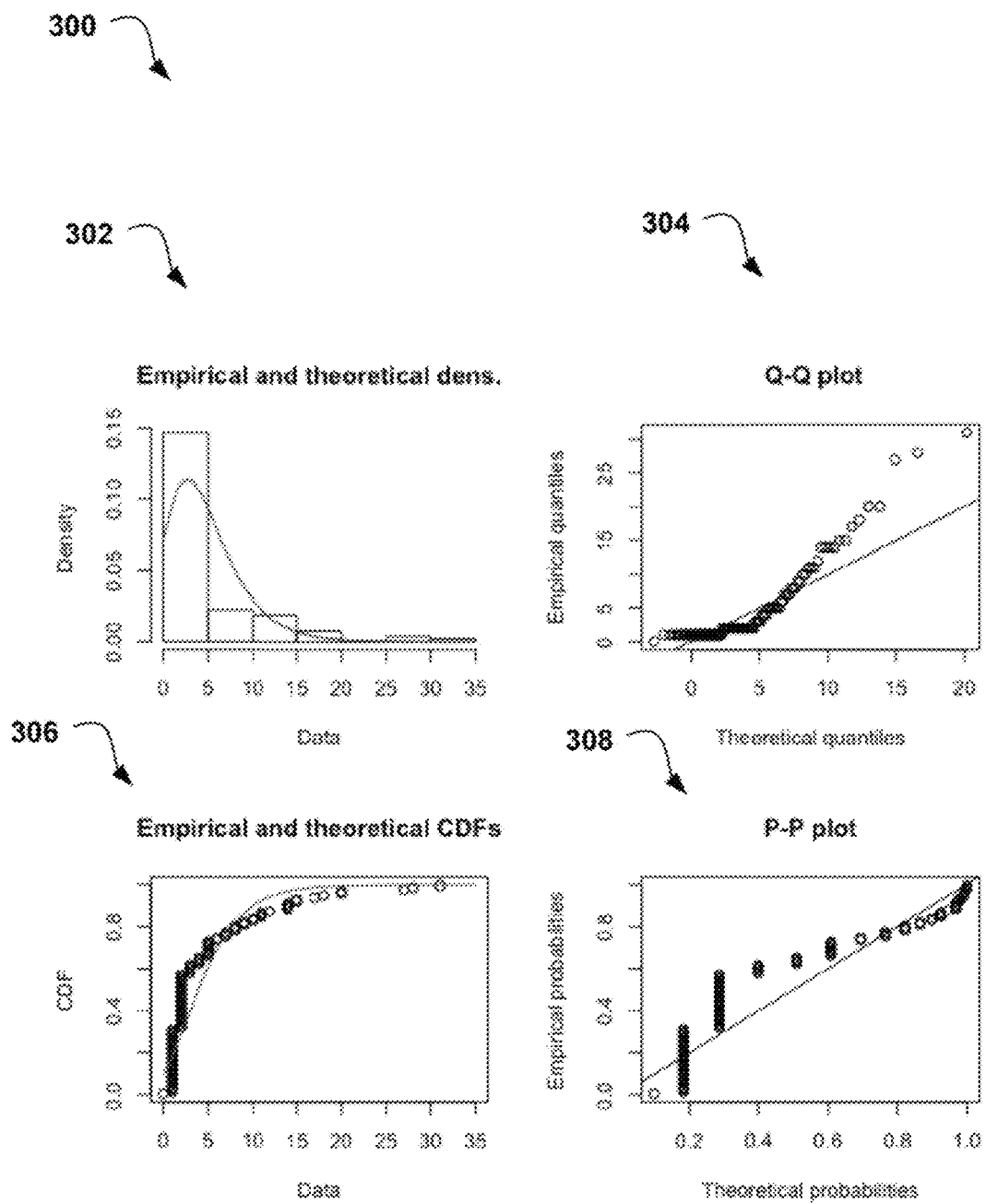
FIG. 3 is a functional block diagram of generated histograms according to at least one embodiment.

Referring now to FIG. 3, a functional block diagram of generated histograms 300 is depicted according to at least one embodiment. While determining a probability distribution based on analyzing the captured group chat messages over a time vector, the expected group chat segment duration program 110A, 110B may generate one or more histograms 302-308 to aid in data analysis. A histogram 302 of chat messages recorded with a fitted probability density function curve may be generated that is specific to the underlying data. Another histogram 304 may display a Quantile (Q-Q) plot of the underlying data with respect to the fitted curve/line. The Q-Q plot histogram 304 may be used to graphically infer GoF. The expected group chat segment duration program 110A, 110B may generate a histogram 306 that displays a cumulative density function (CDF) graph, which may illustrate the measured CDF values against values inferred by the fitted distribution. The expected group chat segment duration program 110A, 110B may also generate a histogram 308 displaying a probability (P-P) ploy of the underlying data with respect to the fitted probabilities of the underlying data.

Figure 4:
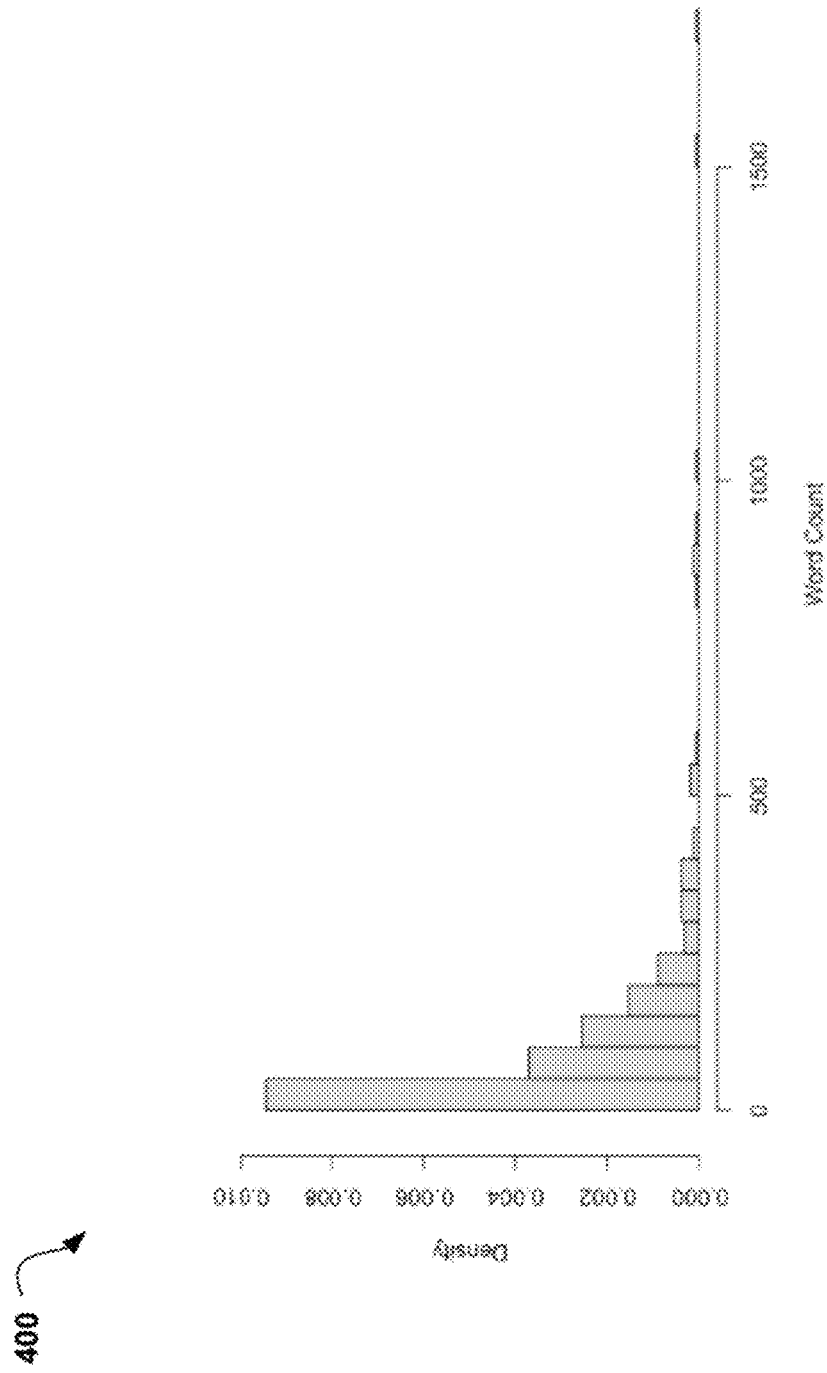
FIG. 4 is an underlying data chat message data set histogram according to at least one embodiment.

Referring now to FIG. 4, an underlying data chat message data set histogram 400 is depicted according to at least one embodiment. The underlying data chat message data set histogram 400 depicts the underlying data chat message data set before the underlying probability distribution is identified by the expected group chat segment duration program 110A, 110B.

Figure 5:
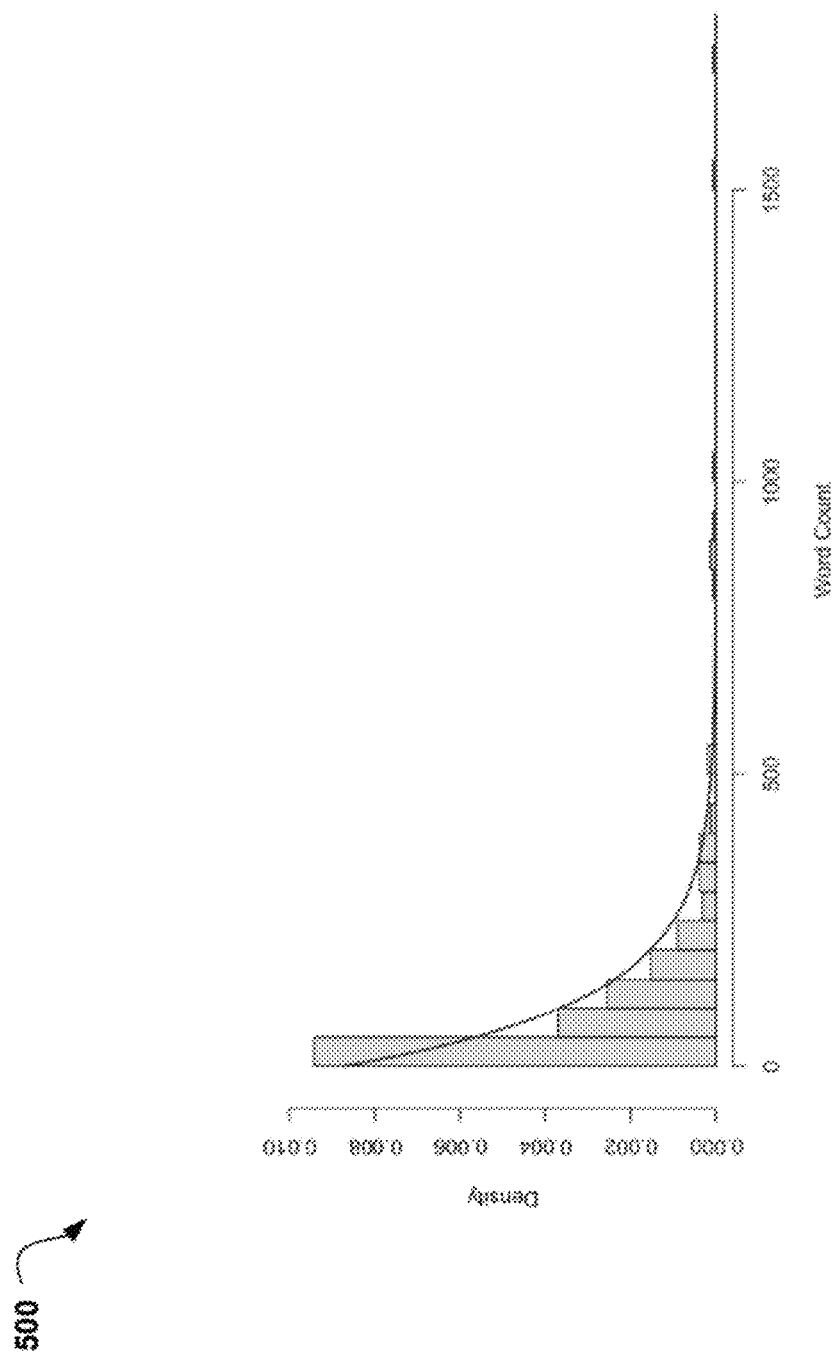
FIG. 5 is an underlying data chat message data set histogram according to at least one embodiment.

Referring now to FIG. 5, an underlying data chat message data set histogram 500 is depicted according to at least one embodiment. The histogram 500 displays the underlying data with a fitted probability density function calculated from the time vector alone (e.g., message inter-arrival time). Therefore, the line fitted to the histogram 500 is a reasonable fit but not the best fit.

Figure 6:
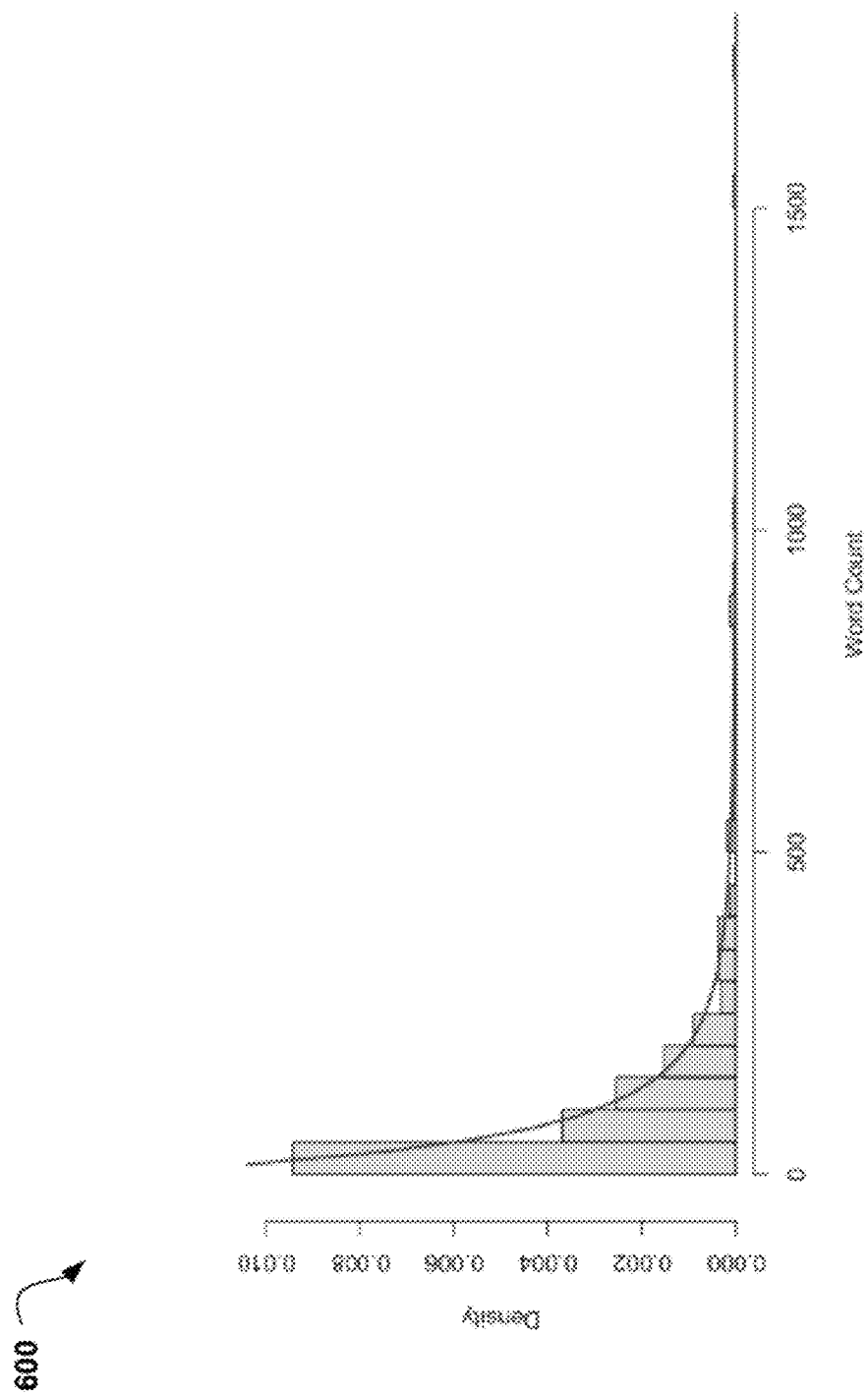
FIG. 6 is an underlying data chat message data set histogram according to at least one embodiment.

Referring now to FIG. 6, an underlying data chat message data set histogram 600 is depicted according to at least one embodiment. The histogram 600 displays the underlying data with a fitted probability density function calculated from the topic vector alone (e.g., maximum likelihood estimation from latent dirichelet analysis). Therefore, as with the underlying data chat message data set histogram 500, the line fitted to the histogram 600 is a reasonable fit but not the best fit.

Figure 7:
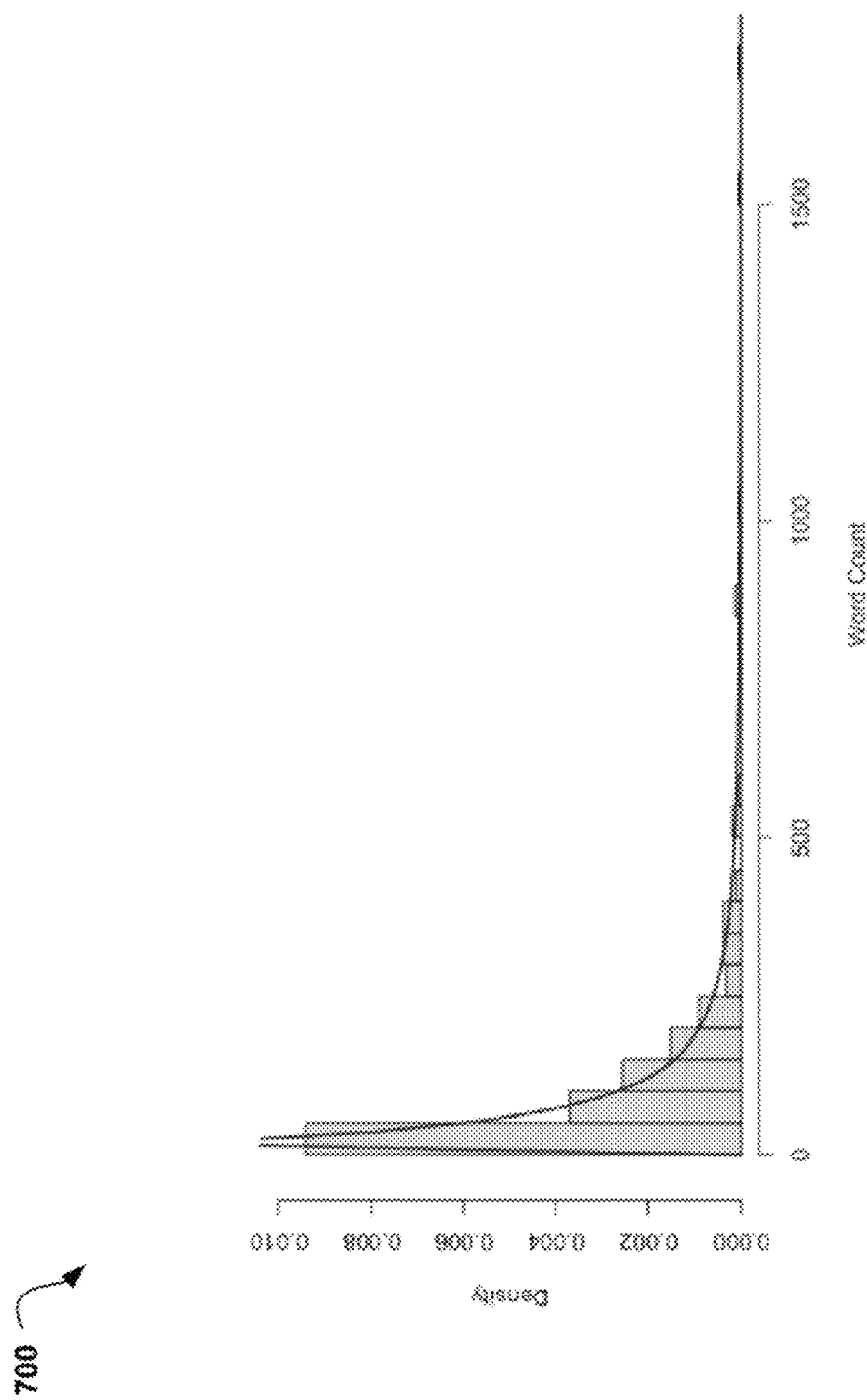
FIG. 7 is an underlying data chat message data set histogram according to at least one embodiment.

Referring now to FIG. 7, an underlying data chat message data set histogram 700 is depicted according to at least one embodiment. The histogram 700 displays a fitted probability density function calculated from the attendee vector alone (e.g., count analysis of attendees within a chat conversation). Therefore, similar to the previous histograms iterations 500 and 600, the line fitted to the histogram 700 is yet again a reasonable fit but not the best fit.

Figure 8:
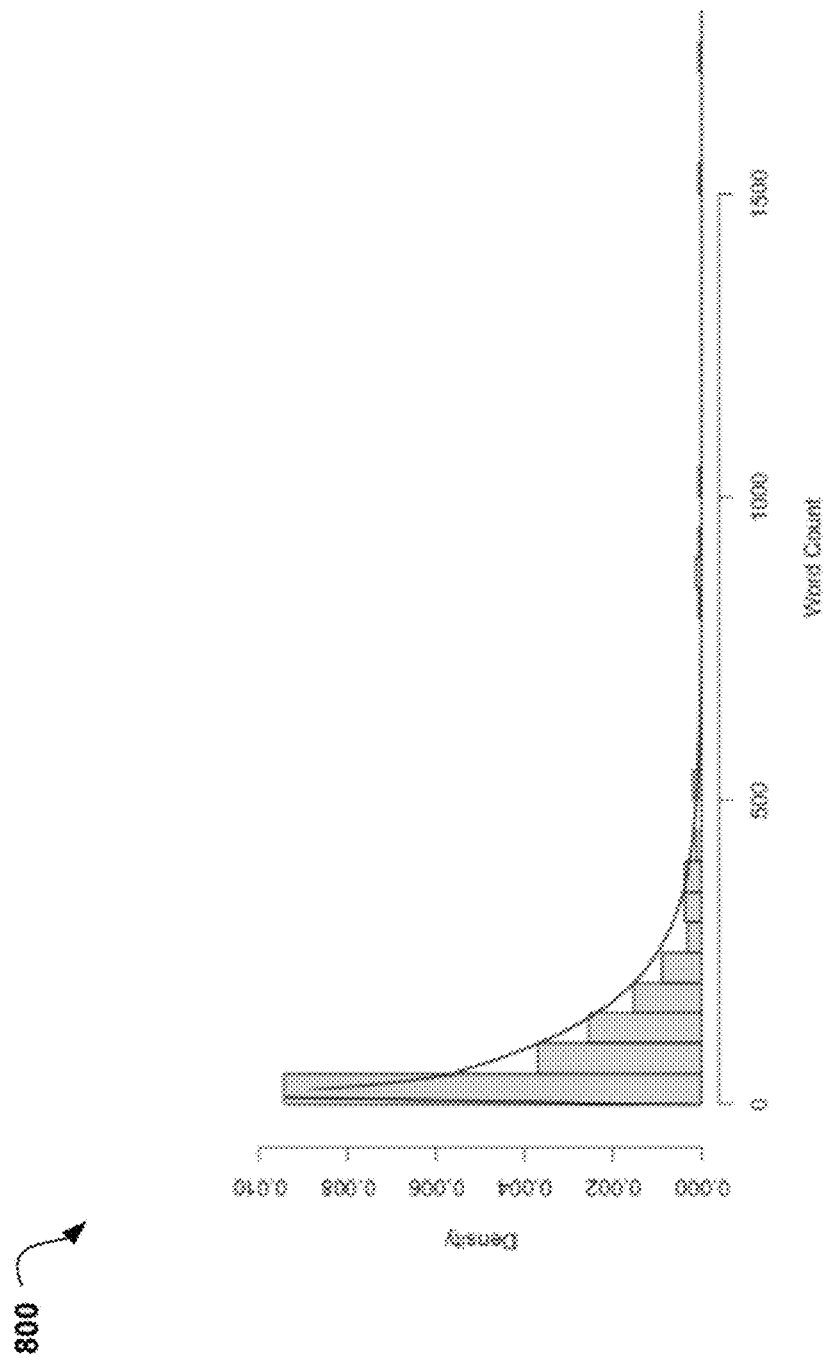
FIG. 8 is an underlying data chat message data set histogram according to at least one embodiment.

Referring now to FIG. 8, an underlying data chat message data set histogram 800 is depicted according to at least one embodiment. When generating the underlying data chat message data set histogram 800, the expected group chat segment duration program 110A, 110B may generate a precision model by fitting the displayed data with a fitted phase-type probability density function (PT-PDF). The PT-PDF may use the best section from each of the three probability density functions (e.g., time, topic, and attendee) to determine a more appropriate fitting PT-PDF. The expected group chat segment duration program 110A, 110B may utilize statistical moments of the curve to infer average duration, mean duration, and expected duration.

Figure 9:
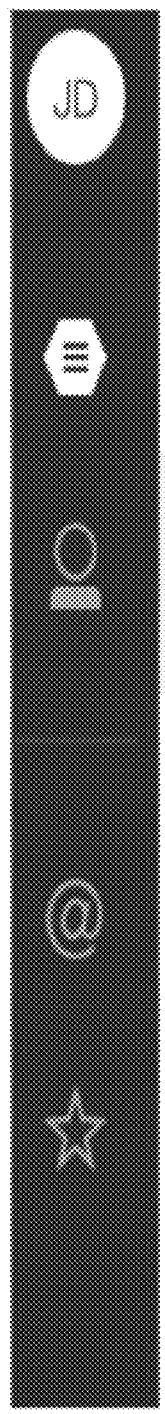
FIG. 9 is a function block diagram of a graphical user interface displaying expected chat duration times according to at least one embodiment.

Referring now to FIG. 9, a function block diagram of a graphical user interface 900 displaying expected chat duration times is depicted according to at least one embodiment. The expected group chat segment duration program 110A, 110B may utilize the precision model may be applied in various ways. For example, the expected chat time duration conveyed within the precision model may be overlaid on chat room times to display how long users may chat in a specific room. Additionally, chat rooms may be ordered so that rooms with longer estimated chat durations are ordered lower in the list rather than chat rooms that have been most recently updated.

Figure 10:
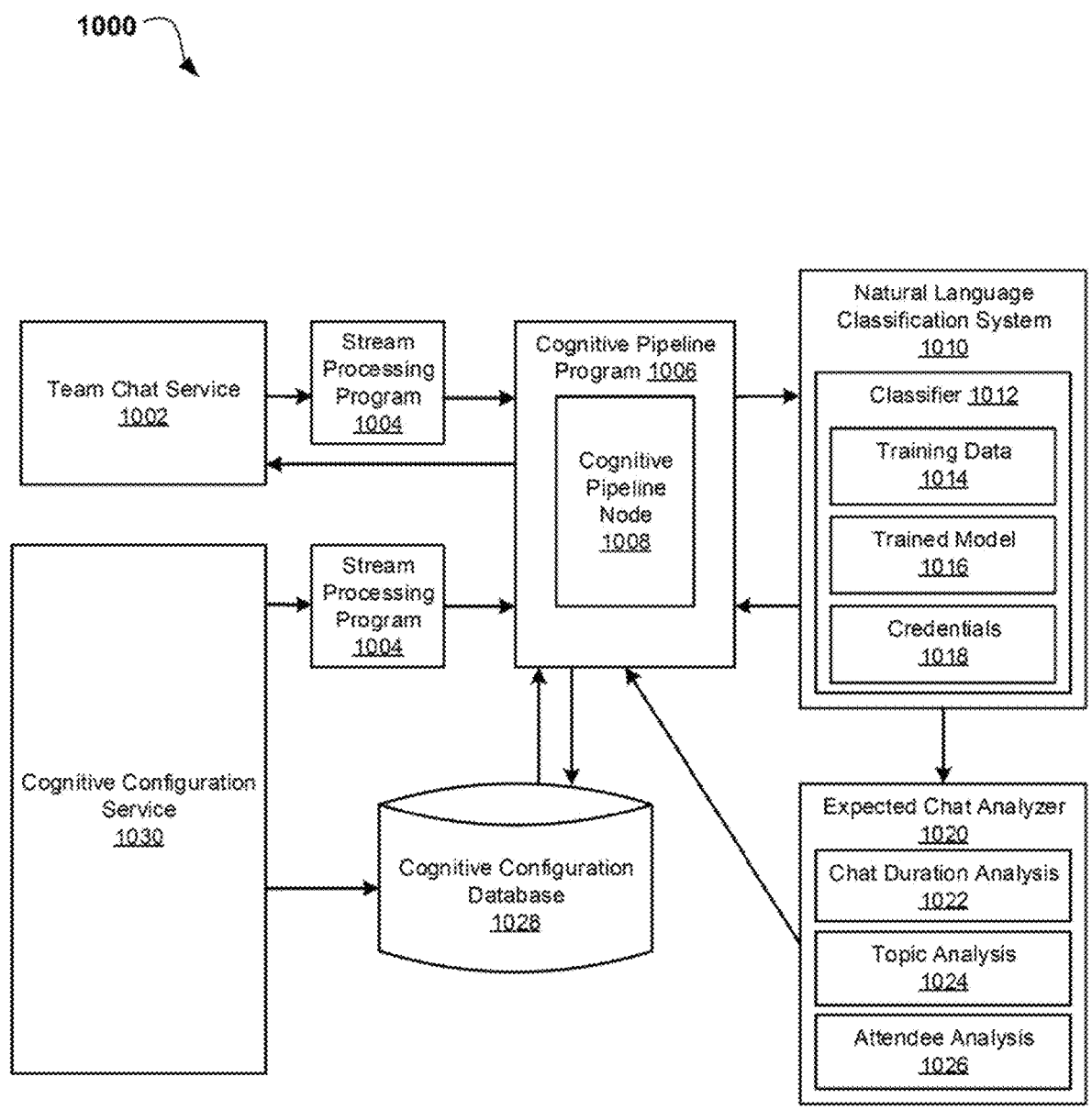
FIG. 10 is a functional block diagram of elements utilized during a chat segment duration process according to at least one embodiment.

Referring now to FIG. 10, a functional block diagram of elements 1000 utilized during a chat segment duration process is depicted according to at least one embodiment. Users may implement a team chat service 1002, such as Slack® (Slack and all Slack-based trademarks and logos are trademarks or registered trademarks of Slack Technologies and/or its affiliates). The team chat service 1002 may be a software program capable of receiving user input text and transmitting the user input text to other individual thereby allowing for communication between users. The team chat service 1002 may transmit the received user input text to a stream processing program, such as Kafka® (Kafka and all Kafka-based trademarks and logos are trademarks or registered trademarks of The Apache Software Foundation and/or its affiliates), which may be capable of holding the received messages in a queue system for subsequent distribution by a cognitive pipeline program 1006, such as Java® (Java and all Java-based trademarks and logos are trademarks or registered trademarks of Oracle Corporation and/or its affiliates). The cognitive pipeline program 1006 may be a mechanism to off-load the queued messages to be analyzed by subsequent cognitive systems, and host one or more cognitive pipeline nodes 1008. One of the subsequent cognitive systems may be a natural language classification system 1010, such as IBM Watson® NLC (IBM Watson and all IBM Watson-based trademarks and logos are trademarks or registered trademarks of International Business Machines Corporation and/or its affiliates). The natural language classification system 1010 may host a cognitive message classifier 1012 that itself may host classifier training data 1014, classifier trained models 1016, and credentials 1018. Once the cognitive pipeline program 1006 analyzes the messages to generate time, topic, and attendee calculations, the calculation data may be transmitted to the expected chat analyzer 1020 to infer expected chat conversation duration. The expected chat analyzer 1020 may utilize micro services, such as chat duration analysis 1022, topic analysis 1024, and attendee analysis 1026, to calculate chat duration over a time vector, a topic vector, and an attendee vector, individually. The expected chat analyzer 1020 may return the calculation results to the cognitive pipeline program 1006 which, in turn, may store messages in a cognitive configuration database 1028, which may allow chat messages to be stored for subsequent recall. Additionally, the cognitive configuration service 1030 may be a known supplementary service that allows for various aspects to be configured, such as precision thresholds of analysis and timeouts.

It may be appreciated that FIGS. 2-10 provide only an illustration of one implementation and do not imply any limitations with regard to how different embodiments may be implemented. Many modifications to the depicted environments may be made based on design and implementation requirements. More specifically, in at least one embodiment, the duration of the group chat may be additionally influenced by understanding the influencing factors and using that understanding to manipulate variables in order to achieve the desired chat duration. For example, if an expected chat duration is 15 minutes and a user designated as the meeting chair desires a 5 minute duration, the expected group chat segment duration program 110A, 110B may notify a user of the preconfigured time constraints should the user become distracted with a different chat window or task.

In another embodiment, the expected group chat segment duration program 110A, 110B may additionally infer multiple different chat durations for a chat room based on environmental factors, such as geo-specific public holidays (e.g., a national holiday) or weather conditions (e.g., hurricane or tornado impact), since such factors may either positively or negatively impact the chat duration. Similarly, the expected group chat segment duration program 110A, 110B may analyze attendee locations to determine expected attendee presence and participation in a persistence chat. The user location data may be captured from various media, such as social media networks or global positioning system enabled devices. For example, if a user posts pictures from a vacation, the user may not participate in the persistent chat while the user is away. Therefore, the expected chat duration time may be impacted by the user's absence.

In yet another embodiment, the expected group chat segment duration program 110A, 110B may make a specific collaborator or overall team metrics visible to all chat participants or attendees. The expected group chat segment duration program 110A, 110B may provide users with information about the most contributing participant, the least contributing participant, predictable participant behavior in relation to a specific topic, or predictable participant behavior in relation to the presence of a specific attendee. For example, the expected group chat segment duration program 110A, 110B may be capable of determining that users and conversations last much longer when a specific user is involved or when a specific topic is discussed at any point during the conversation.

In yet another embodiment, the expected group chat segment duration program 110A, 110B may utilize the output of the expected duration to prioritize key user actions. For example, the expected group chat segment duration program 110A, 110B may snooze notifications for a group chat for the predicted duration of the conversation.

In yet another embodiment, the expected group chat segment duration program 110A, 110B may calculate expected topical contribution duration during the creation of a new chat group. For example, adding User A to a group chat about data science may result in the addition of a primary contributor since User A may be knowledgeable in the field of data science. Similarly, adding User B to the same group may result in adding a primary consumer (i.e., an attendee that does not participate often) of the conversation.

Figure 11:
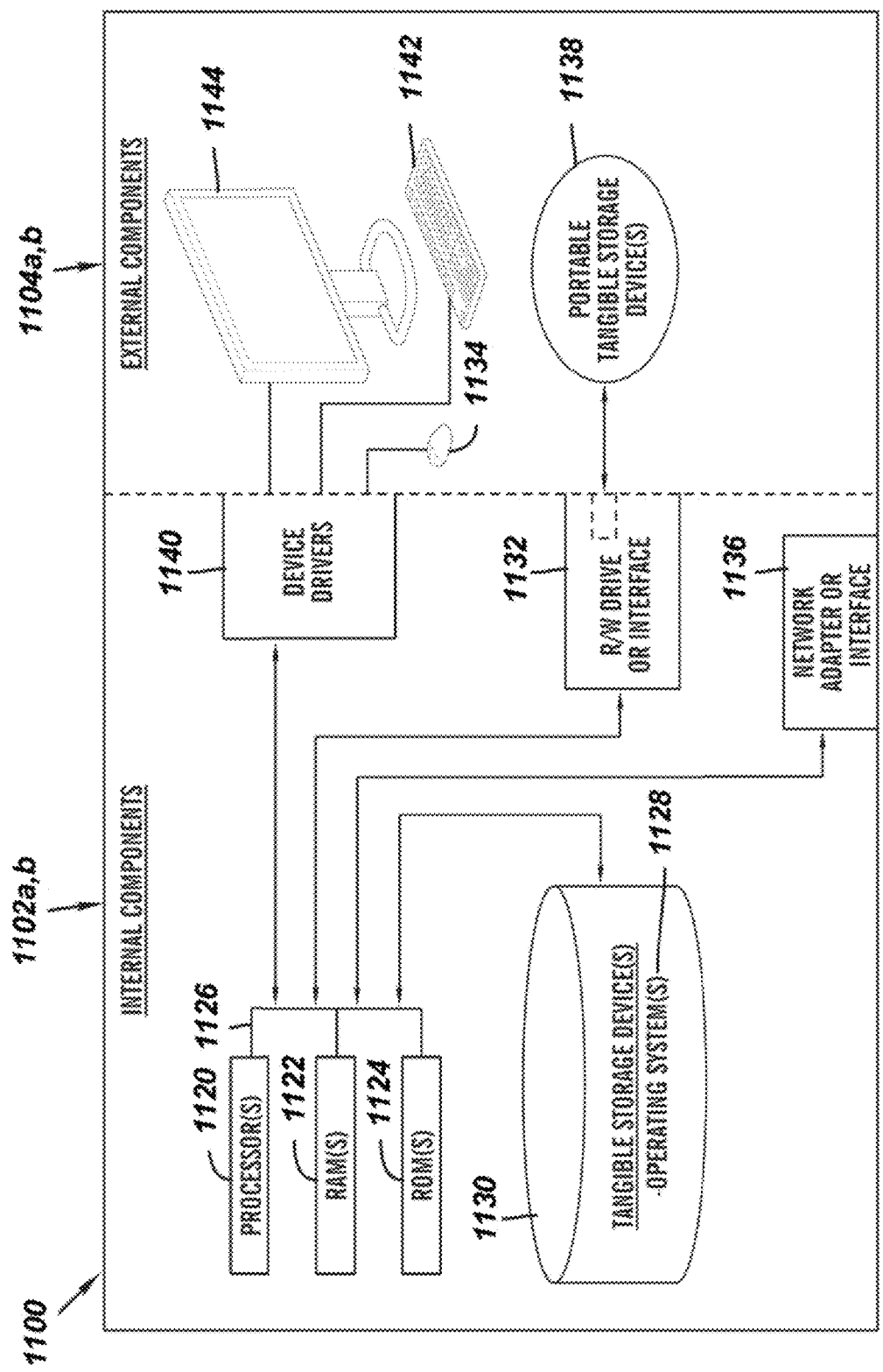
FIG. 11 is a block diagram of internal and external components of computers and servers depicted in FIG. 1 according to at least one embodiment.

FIG. 11 is a block diagram 1100 of internal and external components of the client computing device 102 and the server 112 depicted in FIG. 1 in accordance with an embodiment of the present invention. It should be appreciated that FIG. 11 provides only an illustration of one implementation and does not imply any limitations with regard to the environments in which different embodiments may be implemented. Many modifications to the depicted environments may be made based on design and implementation requirements.

The data processing system 1102, 1104 is representative of any electronic device capable of executing machine-readable program instructions. The data processing system 1102, 1104 may be representative of a smart phone, a computer system, PDA, or other electronic devices. Examples of computing systems, environments, and/or configurations that may represented by the data processing system 1102, 1104 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The client computing device 102 and the server 112 may include respective sets of internal components 1102 a,b and external components 1104 a,b illustrated in FIG. 11. Each of the sets of internal components 1102 include one or more processors 1120, one or more computer-readable RAMs 1122, and one or more computer-readable ROMs 1124 on one or more buses 1126, and one or more operating systems 1128 and one or more computer-readable tangible storage devices 1130. The one or more operating systems 1128, the software program 108 and the expected group chat segment duration program 110A in the client computing device 102 and the expected group chat segment duration program 110B in the server 112 are stored on one or more of the respective computer-readable tangible storage devices 1130 for execution by one or more of the respective processors 1120 via one or more of the respective RAMs 1122 (which typically include cache memory). In the embodiment illustrated in FIG. 11, each of the computer-readable tangible storage devices 1130 is a magnetic disk storage device of an internal hard drive. Alternatively, each of the computer-readable tangible storage devices 1130 is a semiconductor storage device such as ROM 1124, EPROM, flash memory or any other computer-readable tangible storage device that can store a computer program and digital information.

Each set of internal components 1102 a,b also includes a R/W drive or interface 1132 to read from and write to one or more portable computer-readable tangible storage devices 1138 such as a CD-ROM, DVD, memory stick, magnetic tape, magnetic disk, optical disk or semiconductor storage device. A software program, such as the expected group chat segment duration program 110A, 110B, can be stored on one or more of the respective portable computer-readable tangible storage devices 1138, read via the respective R/W drive or interface 1132, and loaded into the respective hard drive 1130.

Each set of internal components 1102 a,b also includes network adapters or interfaces 1136 such as a TCP/IP adapter cards, wireless Wi-Fi interface cards, or 3G or 4G wireless interface cards or other wired or wireless communication links. The software program 108 and the expected group chat segment duration program 110A in the client computing device 102 and the expected group chat segment duration program 110B in the server 112 can be downloaded to the client computing device 102 and the server 112 from an external computer via a network (for example, the Internet, a local area network or other, wide area network) and respective network adapters or interfaces 1136. From the network adapters or interfaces 1136, the software program 108 and the expected group chat segment duration program 110A in the client computing device 102 and the expected group chat segment duration program 110B in the server 112 are loaded into the respective hard drive 1130. The network may comprise copper wires, optical fibers, wireless transmission, routers, firewalls, switches, gateway computers and/or edge servers.

Each of the sets of external components 1104 a,b can include a computer display monitor 1144, a keyboard 1142, and a computer mouse 1134. External components 1104 a,b can also include touch screens, virtual keyboards, touch pads, pointing devices, and other human interface devices. Each of the sets of internal components 1102 a,b also includes device drivers 1140 to interface to computer display monitor 1144, keyboard 1142, and computer mouse 1134. The device drivers 1140, R/W drive or interface 1132, and network adapter or interface 1136 comprise hardware and software (stored in storage device 1130 and/or ROM 1124).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 12:
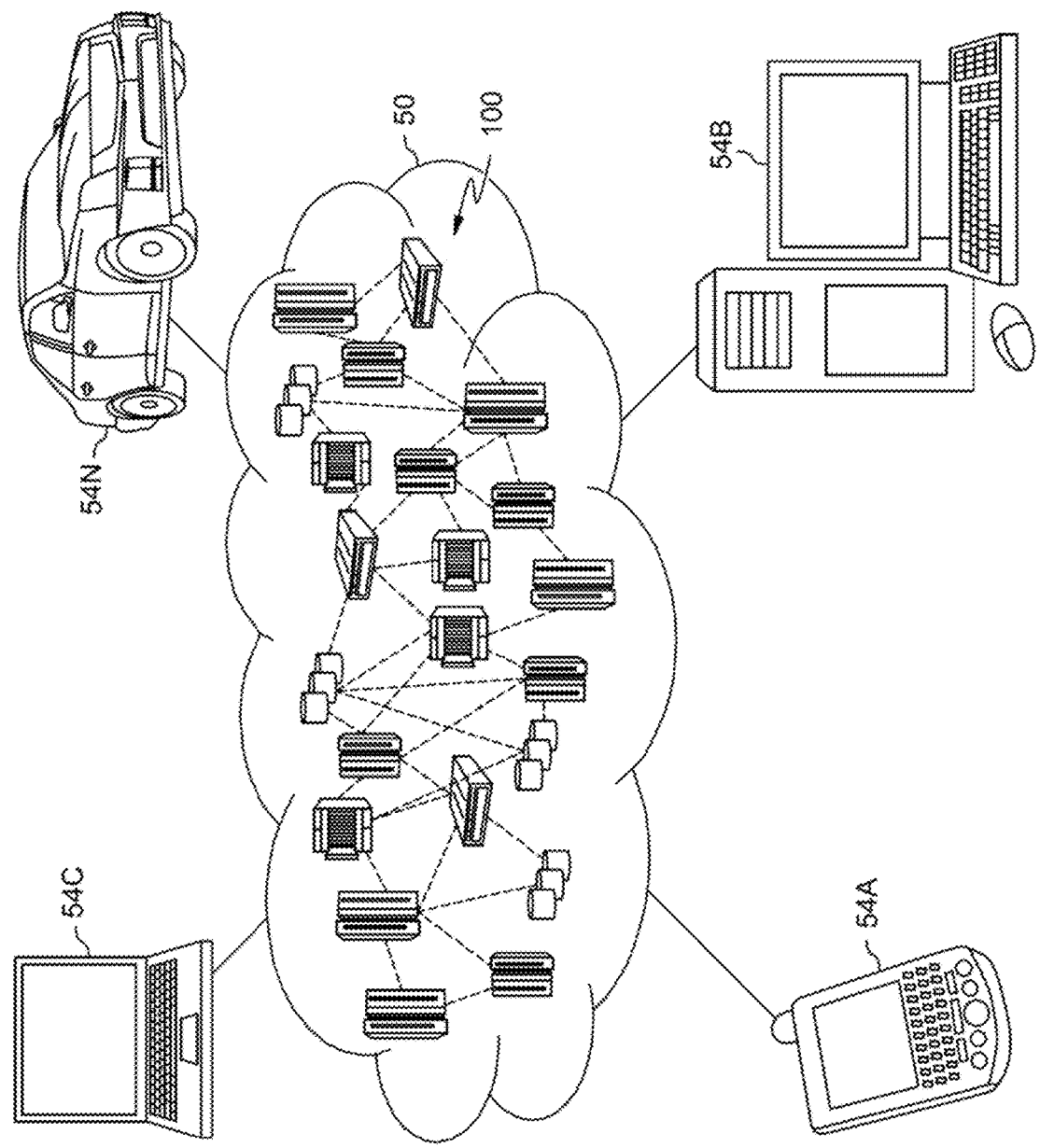
FIG. 12 depicts a cloud computing environment according to an embodiment of the present invention.

Referring now to FIG. 12, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 12 are intended to be illustrative only and that computing nodes 100 and cloud computing environment 50 can communicate with any type of computerized device over any type of network and/or network addressable connection (e.g., using a web browser).

Figure 13:
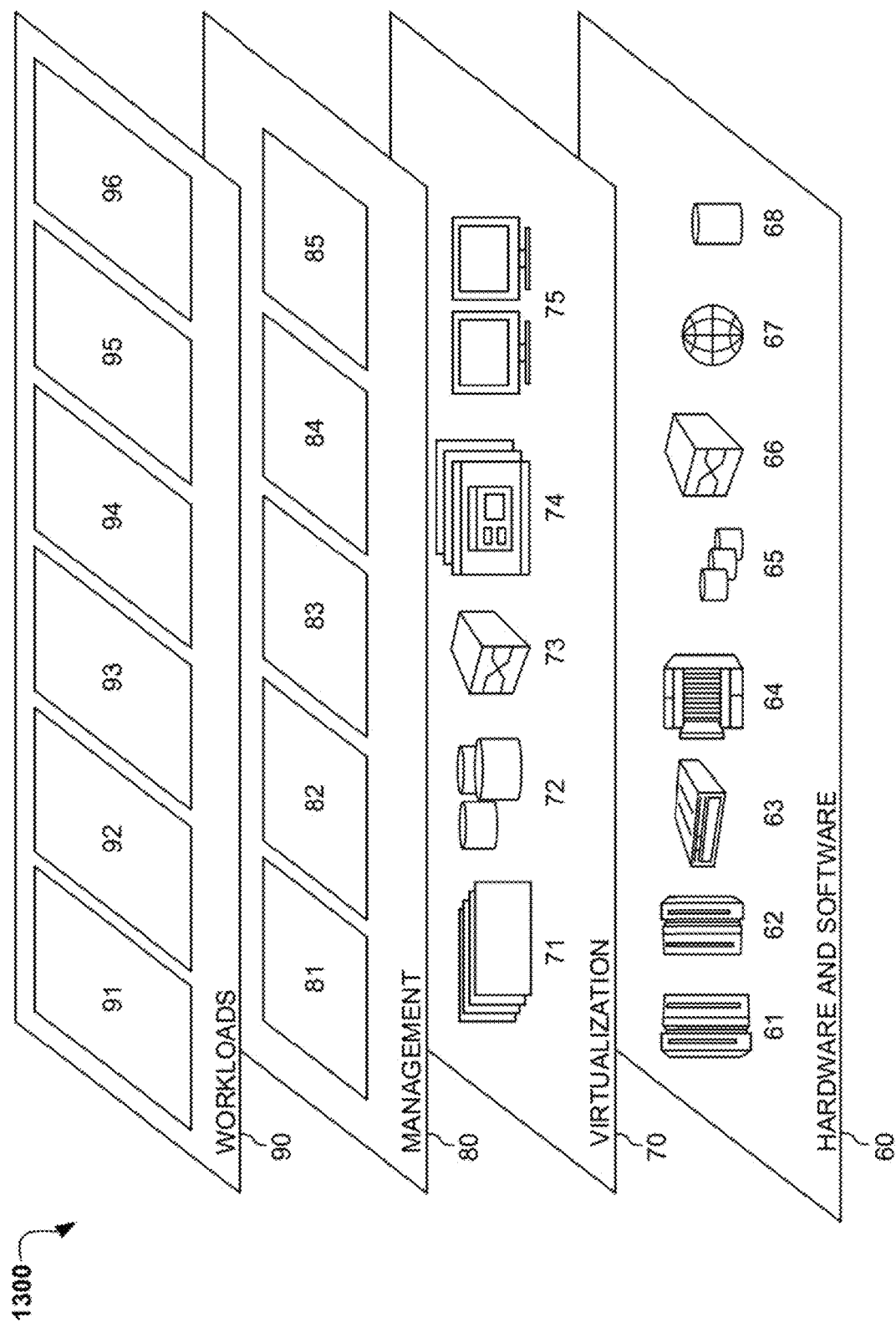
FIG. 13 depicts abstraction model layers according to an embodiment of the present invention.

Referring now to FIG. 13, a set of functional abstraction layers 1300 provided by cloud computing environment 50 is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and expected group chat segment duration calculation 96. Expected group chat segment duration calculation 96 may relate to analyzing captured user messaging data to determine various paraments related to the group chat, such as time, content, and attendee parameters, and predicting a chat duration length from the determined parameters.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for calculating a group chat segment duration, the method comprising:
   determining a probability distribution based on analyzing group chat messages over a time vector;
   calculating a time parameter based on the determined probability distribution;
   calculating a content parameter based on one or more relevant chat topics;
   calculating an attendee parameter based on a plurality of attendees and one or more attendee associations; and
   determining a chat duration prediction based on the calculated time parameter, the calculated content parameter, and the calculated attendee parameter.

2. The method of claim 1, wherein calculating the attendee parameter further comprises:
   identifying the plurality of attendees and attendee associations with the one or more relevant chat topics using one or more regression analysis techniques.

3. The method of claim 1, further comprising:
   displaying the determined chat duration prediction on a graphical user interface of a computing device.

4. The method of claim 1, wherein the chat duration prediction considers one or more environmental factors when determining the chat duration prediction, and wherein the one or more environmental factors are selected from a group consisting of a plurality of geo-specific holidays, a plurality of weather conditions, and a user location.

5. The method of claim 1, further comprising:
   calculating one or more team chat metrics, wherein the one or more team chat metrics are selected from a group consisting of a most contributing participant, a least contributing participant, predictable participant behavior in relation to a specific topic, and predictable participant behavior in relation to the presence of a specific attendee; and
   displaying, publicly, the one or more calculated team chat metrics.

6. The method of claim 1, wherein determining the chat duration prediction further comprises:
   calculating an expected topical contribution duration for each participant in a chat group.

7. The method of claim 1, further comprising:
   receiving a user preconfigured desired chat duration for a chat conversation;
   determining the chat duration prediction is greater than received user preconfigured desired chat duration; and
   in response to determining a user is distracted from the chat conversation, notifying the user of the received user preconfigured desired chat duration.

8. A computer system for calculating a group chat segment duration, the computer system comprising:
   one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:
   determining a probability distribution based on analyzing group chat messages over a time vector;
   calculating a time parameter based on the determined probability distribution;
   calculating a content parameter based on one or more relevant chat topics;
   calculating an attendee parameter based on a plurality of attendees and one or more attendee associations; and
   determining a chat duration prediction based on the calculated time parameter, the calculated content parameter, and the calculated attendee parameter.

9. The computer system of claim 8, wherein calculating the attendee parameter further comprises:
   identifying the plurality of attendees and attendee associations with the one or more relevant chat topics using one or more regression analysis techniques.

10. The computer system of claim 8, further comprising:
    displaying the determined chat duration prediction on a graphical user interface of a computing device.

11. The computer system of claim 8, wherein the chat duration prediction considers one or more environmental factors when determining the chat duration prediction, and wherein the one or more environmental factors are selected from a group consisting of a plurality of geo-specific holidays, a plurality of weather conditions, and a user location.

12. The computer system of claim 8, further comprising:
    calculating one or more team chat metrics, wherein the one or more team chat metrics are selected from a group consisting of a most contributing participant, a least contributing participant, predictable participant behavior in relation to a specific topic, and predictable participant behavior in relation to the presence of a specific attendee; and
    displaying, publicly, the one or more calculated team chat metrics.

13. The computer system of claim 8, wherein determining the chat duration prediction further comprises:
    calculating an expected topical contribution duration for each participant in a chat group.

14. The computer system of claim 8, further comprising:
    receiving a user preconfigured desired chat duration for a chat conversation;
    determining the chat duration prediction is greater than received user preconfigured desired chat duration; and
    in response to determining a user is distracted from the chat conversation, notifying the user of the received user preconfigured desired chat duration.

15. A computer program product for calculating a group chat segment duration, the computer program product comprising:
    one or more non-transitory computer-readable tangible storage media and program instructions stored on at least one of the one or more non-transitory computer-readable tangible storage media, the program instructions executable by a processor of a computer to perform a method, the method comprising:
    determining a probability distribution based on analyzing group chat messages over a time vector;
    calculating a time parameter based on the determined probability distribution;
    calculating a content parameter based on one or more relevant chat topics;
    calculating an attendee parameter based on a plurality of attendees and one or more attendee associations; and
    determining a chat duration prediction based on the calculated time parameter, the calculated content parameter, and the calculated attendee parameter.

16. The computer program product of claim 15, wherein calculating the attendee parameter further comprises:
    identifying the plurality of attendees and attendee associations with the one or more relevant chat topics using one or more regression analysis techniques.

17. The computer program product of claim 15, further comprising:
    displaying the determined chat duration prediction on a graphical user interface of a computing device.

18. The computer program product of claim 15, wherein the chat duration prediction considers one or more environmental factors when determining the chat duration prediction, and wherein the one or more environmental factors are selected from a group consisting of a plurality of geo-specific holidays, a plurality of weather conditions, and a user location.

19. The computer program product of claim 15, further comprising:
    calculating one or more team chat metrics, wherein the one or more team chat metrics are selected from a group consisting of a most contributing participant, a least contributing participant, predictable participant behavior in relation to a specific topic, and predictable participant behavior in relation to the presence of a specific attendee; and
    displaying, publicly, the one or more calculated team chat metrics.

20. The computer program product of claim 15, wherein determining the chat duration prediction further comprises:
    calculating an expected topical contribution duration for each participant in a chat group.

\* \* \* \* \*